J. DILDINE.
Animal Traps.

No. 154,461. Patented Aug. 25, 1874.

Witnesses.
C. F. Brown
M. Church

Inventor
John Dildine
by his Att'ys.

UNITED STATES PATENT OFFICE.

JOHN DILDINE, OF LIMESTONEVILLE, PENNSYLVANIA.

IMPROVEMENT IN ANIMAL-TRAPS.

Specification forming part of Letters Patent No. 154,461, dated August 25, 1874; application filed July 30, 1873.

*To all whom it may concern:*

Be it known that I, JOHN DILDINE, of Limestoneville, in the county of Montour and State of Pennsylvania, have invented a new and Improved Animal-Trap; and I do hereby declare the following to be a full and exact description of the same, reference being had to the accompanying drawings forming part of this specification, in which—

Figure 1:
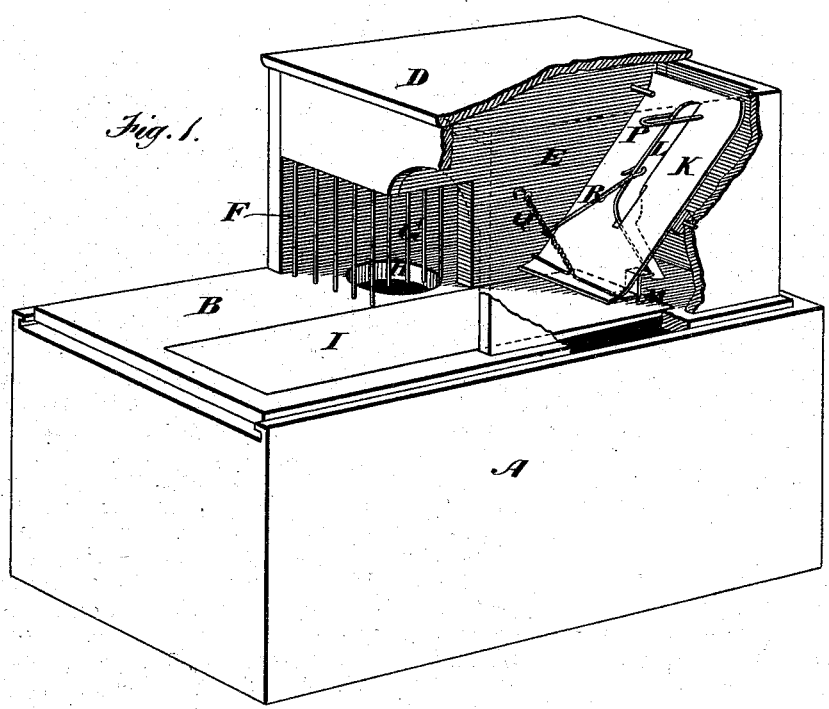
Figure 2:
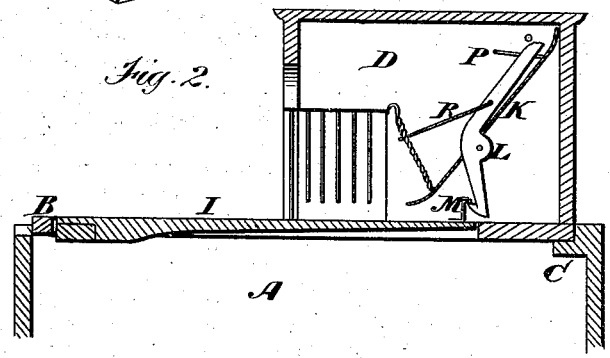
Figure 3:
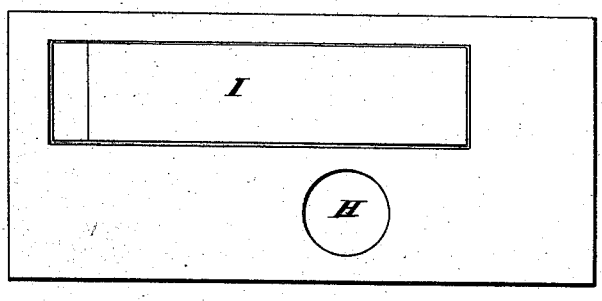

Figure 1 is a perspective view of my improved trap. Fig. 2 is a longitudinal section of the same, and Fig. 3 is a bottom-plan view of the weighted trap-door.

Similar letters of reference in the accompanying drawings denote the same parts.

My invention has for its object to improve the construction of the animal-trap for which Letters Patent of the United States were granted to me December 10, 1872. In said patent is shown a box or receptacle provided with a cover cut away in the center to receive a weighted trap-door. A frame is arranged at one end of this cover, and to the top of said frame a flanged apron is hinged, so as to hang in a vertical position over the end of the trap-door. Behind this apron a catch is pivoted, to engage the end of the trap-door, and hold it in a vertical position until released by the animal stepping upon the flange of the apron or pulling forward the bait-arm, which is arranged to connect with the upper end of the catch. When the trap-door is released the animal is precipitated by his own weight into the box below, and the trap-door automatically rises to close the opening and again set the trap.

My present invention consists, first, in pivoting the flanged apron in an inclined position within the trap, in order to render the engagement of the trap-door with the catch, after the former has been tilted, quicker and more certain; secondly, in the arrangement of the catch within the inclined apron instead of upon separate supports, as in my former patent, in order to render the catch sensitive to the slightest movements of the apron; thirdly, in the combination of the various parts, as I will now proceed to describe.

In the accompanying drawings, A is a box of suitable form and size to support the trap proper and form a receptacle into which the animals are precipitated when the trap is sprung. B is the bottom board of the trap, supported by the front end of the box A and a cross-bar, C, at its rear end; and D is the case of the trap, secured to the bottom board so as to extend about two-thirds the length thereof. The case D is divided longitudinally into two compartments, E F, by the wooden partition and the vertical wires G, the compartment E being open at the front, and the compartment F closed by vertical wires, as shown. This latter compartment communicates with the receptacle A through an opening, H, in the bottom board. The vertical wires which form the front continuation of the vertical partition terminate at their lower ends just above the bottom board B, so that in case the animal should seize the wires to prevent his falling into the receptacle A, his hold would slip off the ends of such wires and allow him to drop into the receptacle. I is the trap-door, pivoted within an opening in the board B, so as to extend in front of and form the bottom of the compartment E. Its shorter end is provided with a weight, as shown, to counterbalance its longer end within the trap. K is the apron, pivoted in an inclined position to the walls of the compartment E, so that its upper end will rest against the end wall of the compartment, and its lower flanged end extend somewhat over the inner end of the trap-door. L is the catch-bar, extending vertically through the inclined apron at or near the center thereof, where it is pivoted. Its upper end rests against the front of the apron at the top, and within a long guide-loop, P, projecting to the front thereof, while its lower end in rear of the apron is adapted to engage with a stop, M, projecting upward from the inner end of the trap-door. The upper end of the bar L being the heaviest, it falls back against the top of the apron and so holds the catch properly engaged with the stop, as shown. Q is the bait-hook, resting upon the bottom flange of the inclined apron, as shown in Fig. 1, and connected to the catch-bar L in front of the apron by a hooked wire or rod, R.

The operation of my improved trap is as follows: The animal, entering the compartment E from the front, passes to the bait-hook, and in order to reach the bait places his forefeet upon the flange of the inclined apron, his weight moving the latter backward, and consequently releasing the catch from the stop, when the trap-door tilts and precipitates the animal into the receptacle A, such door being immediately raised and set again by the weight at its outer end. The inclination of the flanged apron causes its upper end to drop back quickly against the end of the compartment, and thereby insures the automatic setting of the trap. In some cases the bait is taken without the animal touching the apron, when a slight pull upon the bait presses the hook down upon the apron and releases the catch. The trap is sprung, therefore, either by pulling the bait-hook, or by pressing upon the apron, or by both operations combined.

The entrapped animal may escape from the receptacle A into the compartment F, passing through the hole in the bottom of the latter, and, being visible through the wires that form the front and inner side of such compartment, serve as a decoy to lead other animals into the trap.

I design to line with sheet metal all such portions of the trap as are liable to be gnawed by the animals in their efforts to escape, and in large-sized traps I propose to employ two detents or catches instead of one, in order to render the action of the parts certain.

When it is desired to dispose of the animals contained in the receptacle A, the trap is removed therefrom and a sliding cover applied to the receptacle, which thus becomes a closed box, and may be removed to any convenient place for destroying the animal.

I claim as my invention—

1. The flanged apron pivoted within the compartment E of the trap in an inclined position, with its upper end against the end of such compartment and its lower end extending over the trap-door, substantially as described, for the purpose specified.

2. The catch pivoted in and extending upward through the inclined apron, so that its upper end shall bear against the front of the latter and its lower end engage with the trap-door in rear of the apron, substantially as described, for the purpose specified.

3. The bait-hook Q and hook-rod R, combined with the catch-bar and inclined apron, substantially as described, for the purpose specified.

4. The guide-loop P, combined with the inclined apron and a catch-bar, substantially as described.

5. The combination of the inclined pivoted apron, the pivoted spring-catch, the hinged bait-strip, and the connecting-rod with each other and the trap-door, substantially as described, for the purpose specified.

6. The front wires of the partition, terminating at their lower ends a short distance above the bottom board of the trap, substantially as described, and for the purpose specified.

JOHN DILDINE.

Witnesses:
    W. D. WEIDENHAMER,
    W. A. SMITH.